No. 774,678. PATENTED NOV. 8, 1904.
H. A. LOCKWOOD.
ROLLER BEARING.
APPLICATION FILED JUNE 22, 1903.
NO MODEL.

WITNESSES:
L. Ginford Handy
Edgar M. Kitchin

INVENTOR
Horace A. Lockwood
BY
Mason Fenwick & Lawrence
his Attorneys

No. 774,678. Patented November 8, 1904.

UNITED STATES PATENT OFFICE.

HORACE A. LOCKWOOD, OF LAKE VALLEY, TERRITORY OF NEW MEXICO.

ROLLER-BEARING.

SPECIFICATION forming part of Letters Patent No. 774,678, dated November 8, 1904.

Application filed June 22, 1903. Serial No. 162,658. (No model.)

*To all whom it may concern:*

Be it known that I, HORACE A. LOCKWOOD, a citizen of the United States, residing at Lake Valley, in the county of Sierra and Territory of New Mexico, have invented certain new and useful Improvements in Roller-Bearings; and I do hereby declare the following to be a full, clear, and exact description of the invention, such as will enable others skilled in the art to which it appertains to make and use the same.

This invention relates to improvements in hubs, and particularly to antifriction attachments therefor.

The object in view is the provision of antifriction means which may be applied to any common form of hub; and this object is attained by the employment, in combination with a hub, of bearing-casings, means for fixing the same to the ends of the hub, and antifriction means within said casing.

It further consists in certain other novel constructions, combination, and arrangement of parts, as will be hereinafter fully described and claimed.

Figure 1:
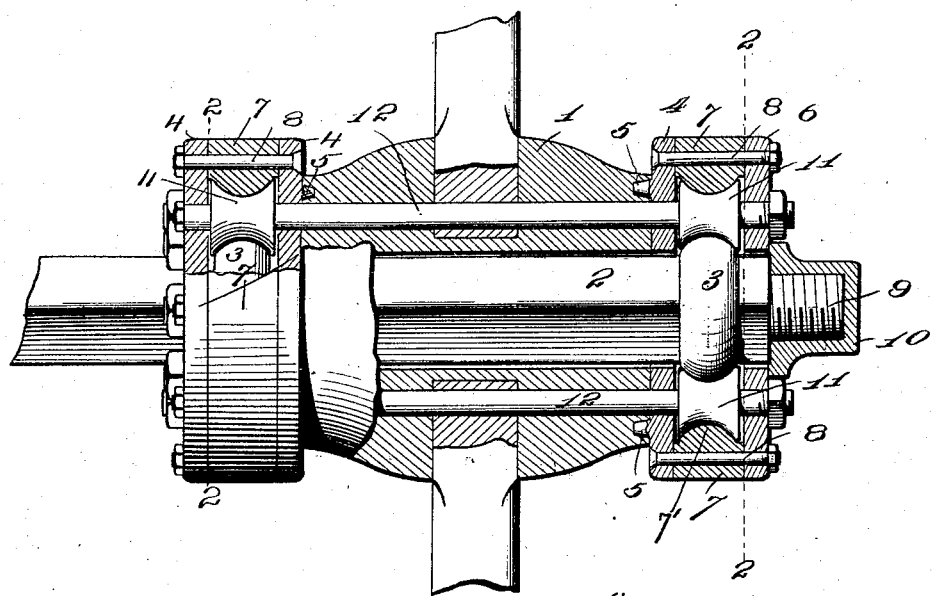
Figure 2:
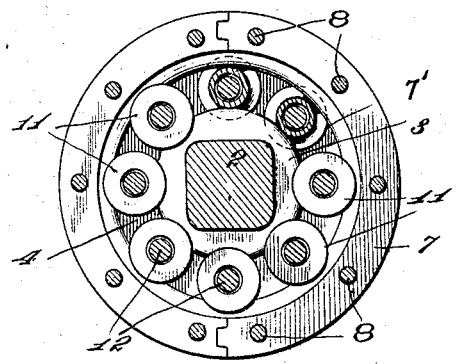

In the accompanying drawings, Figure 1 is a partial sectional view through a hub and bearing-casing embodying the features of the present invention, parts being shown in elevation. Fig. 2 is a transverse vertical section taken on the plane of line 2 2 of Fig. 1.

Referring to the drawings by numerals, 1 indicates any common form of hub bored centrally for the reception of an axle 2, which axle is preferably formed square or polysided. The axle 2 extends beyond the ends of the hub 1 and is provided outside each end of said hub with an annular bearing-plate 3, positioned between the walls of a bearing-housing arranged outside the respective ends of said hub 1. Each of said housings consists of a disk or plate 4, provided with laterally inwardly projecting lugs 5, designed to engage recesses in the hub 1, and a similar plate 6, spaced from the plate 4 and retained in its given relation thereto by an interposed spacing-ring 7, formed with an annular transversely-convexed surface 7', and securing means, as bolts 8, passed through said plates and ring for clamping the parts in the given relation. The plates 4 and 6 are apertured centrally for admitting the axle 2, which extends therethrough and extends beyond the outer one of said plates and is preferably threaded, as at 9, for the reception of a retaining-cap 10.

Each plate 3 is formed with a convexed peripery designed to engage spools 11, which form antifriction means and travel about said rings, and each of which spools is rotatably mounted upon a bolt 12, extending longitudinally through the hub 1 and through both the sets of plates 4 and 6 and retained in position by a suitable nut at each end. The spools 11 are formed with their central bores of greater diameter than their respective bolts and in operation ride upon the convexed surfaces 7' of respective rings 7, while supporting the corresponding plates 3, so that the weight sustained by the axle is transferred to the hub through the spools 11 and rings 7 without strain or frictional wear upon the bolts 12.

When the parts are assembled and operated, the hub and bearing-casings at its ends rotate about the axle, the fixed surface periphery of the plate 3 resting upon and bearing against the concaved surfaces of the spools 11 as the same move beneath the axle-bearing against the surface 7', friction between the parts thus being reduced to a minimum. It will of course be observed that each of the bearing-housings, with its inclosures, constitutes a support for one end of the hub—that is, a means for retaining the hub against lateral play with respect to the axle—each of said housings, with its inclosures, forming an auxiliary support with respect to the other. When one of said housings, with its inclosures, is considered as an auxiliary support, the other must necessarily be considered as the main support.

Any suitable lubricating-material-supply means may be provided for introducing a lubricant to the respective bolts 12 at the points carrying spools 11.

Having thus fully described my invention, what I claim as new, and desire to secure by Letters Patent, is—

1. In a device of the class described, the combination with a hub, of bearing-housings connected to said hub outside the ends thereof, rollers within each of said housings, and means extending longitudinally through the housings, through said rollers, and through the hub for retaining the parts in their given positions.

2. In a device of the class described, the combination with a hub, of housings connected to said hub outside the ends thereof, bolts extending longitudinally through said hub and through said housings for retaining the elements in their given relations, and antifriction-rollers loosely mounted on said bolts within said housings.

3. In a device of the character described, the combination of a hub, housings at the ends thereof, means extending through said housings and hub for securing the same together, and antifriction means loosely mounted upon said connecting means within said housings.

4. In a device of the class described, the combination with a hub, of a housing at each end of said hub, bolts extending longitudinally through said hub and said housings, and antifriction means carried by said bolts within the housings.

5. In a device of the class described, the combination with a hub formed with notches in its ends, of a plate at each end of said hub formed with lugs projecting into said notches, plates spaced from said first-mentioned plates, means securing the sets of plates together, and antifriction means arranged between the plates of each of said sets.

6. In a device of the class described, the combination with a hub, of a housing at each end thereof, bolts extending through said housings, and antifriction-bearings loosely carried by said bolts.

7. In a device of the class described, the combination with an axle, a bearing-plate carried thereby, and a hub surrounding said axle, of a main support for said hub comprising a housing fixed to the hub and inclosing said plate, said housing being formed with a bearing-ring carried in the plane of said plate, bolts extending through said housing, and antifriction means loosely mounted upon said bolts and contacting with said plate and ring; and an auxiliary support for said hub.

8. In a device of the class described, the combination with an axle and a hub therefor, of a main support for said hub comprising an annular bearing-plate carried by said axle, a bearing-housing carried by said hub, bolts extending through said housing, and antifriction means loosely carried by said bolts and adapted to support said annular bearing-plate; and an auxiliary support for the hub.

9. In a device of the class described, the combination with a bearing part and a bearing-housing surrounding the same and formed with a bearing-ring, of rollers interposed between said bearing part and ring, and an axle for each of said rollers, each of the rollers being formed with an axial opening through which its respective axle extends, each of said openings being of a diameter exceeding that of its axle to an extent greater than the distance of play of the respective roller between said ring and said bearing part, whereby the bearing part is adapted to be supported by said rollers upon said ring independently of said axles.

In testimony whereof I hereunto affix my signature in presence of two witnesses.

HORACE A. LOCKWOOD.

Witnesses:
E. H. BICKFORD,
G. A. HALLOCK.